US008569980B2

(12) United States Patent
Yang et al.

(10) Patent No.: US 8,569,980 B2
(45) Date of Patent: Oct. 29, 2013

(54) TRASH CAN WITH POWER OPERATED LID

(75) Inventors: Frank Yang, Rancho Palos Verdes, CA (US); Tzu-Hao Wei, Hacienda Heights, CA (US); Myk Wayne Lum, Irvine, CA (US); Yoon J. Kim, Long Beach, CA (US)

(73) Assignee: simplehuman, LLC, Torrance, CA (US)

( * ) Notice: Subject to any disclaimer, the term of this patent is extended or adjusted under 35 U.S.C. 154(b) by 1365 days.

(21) Appl. No.: 12/024,946

(22) Filed: Feb. 1, 2008

(65) Prior Publication Data

US 2009/0194532 A1 Aug. 6, 2009

(51) Int. Cl.
*H02P 3/00* (2006.01)

(52) U.S. Cl.
USPC ........... 318/266; 318/255; 318/256; 318/264; 318/265; 318/466; 318/468; 220/200; 220/211; 220/260; 220/262; 220/263

(58) Field of Classification Search
USPC ......... 318/255, 256, 264, 265, 266, 466, 468; 220/200, 211, 260, 262, 263
See application file for complete search history.

(56) References Cited

U.S. PATENT DOCUMENTS

| | | | |
|---|---|---|---|
| 1,426,211 A | 8/1922 | Pausin | |
| 1,461,253 A | 7/1923 | Obadiah | |
| 1,820,555 A | 8/1931 | Buschman | |
| 1,891,651 A | 12/1932 | Padelford et al. | |
| 1,922,729 A | 8/1933 | Giebel | |
| 1,980,938 A | 11/1934 | Geibel | |
| D148,825 S | 2/1948 | Snider | |
| 2,457,274 A | 12/1948 | Rifken | |
| 2,759,625 A | 8/1956 | Ritter | |
| 2,888,307 A | 5/1959 | Graves et al. | |
| 2,946,474 A | 7/1960 | Knapp | |
| 3,008,604 A | 11/1961 | Garner | |
| 3,023,922 A | 3/1962 | Arrington et al. | |
| 3,654,534 A | 4/1972 | Fischer | |
| 3,820,200 A | 6/1974 | Myers | |
| 3,825,150 A | 7/1974 | Taylor | |
| 3,825,215 A | 7/1974 | Borglum | |
| 3,886,425 A * | 5/1975 | Weiss | 318/468 |
| 3,891,115 A | 6/1975 | Ono | |
| 4,014,457 A | 3/1977 | Hodge | |
| 4,027,774 A | 6/1977 | Cote | |
| 4,081,105 A | 3/1978 | Dagonnet et al. | |

(Continued)

FOREIGN PATENT DOCUMENTS

| | | |
|---|---|---|
| AU | 622536 | 4/1992 |
| CN | 301947175 S | 6/2012 |

(Continued)

OTHER PUBLICATIONS

Search Report for Taiwan Design Patent Application No. 097304453, dated Apr. 22, 2009.

(Continued)

*Primary Examiner* — Kawing Chan
(74) *Attorney, Agent, or Firm* — Knobbe Martens Olson & Bear LLP

(57) ABSTRACT

A trash can include a sensor for detecting the presence of an object near a portion of the trash can. The detection of the object can be used to signal the trash can to open its lid. The trash can include an electronic drive unit for opening and closing the lid.

16 Claims, 12 Drawing Sheets

(56) References Cited

U.S. PATENT DOCUMENTS

| | | | | |
|---|---|---|---|---|
| 4,189,808 | A | 2/1980 | Brown | |
| 4,200,197 | A | 4/1980 | Meyer et al. | |
| 4,217,616 | A | 8/1980 | Jessup | |
| 4,303,174 | A | 12/1981 | Anderson | |
| 4,320,851 | A | 3/1982 | Montoya | |
| 4,357,740 | A | 11/1982 | Brown | |
| 4,416,197 | A | 11/1983 | Kehl | |
| 4,457,483 | A | 7/1984 | Gagne | |
| 4,535,911 | A | 8/1985 | Goulter | |
| 4,570,304 | A | 2/1986 | Montreuil et al. | |
| 4,576,310 | A | 3/1986 | Isgar et al. | |
| D284,320 | S | 6/1986 | Kubic et al. | |
| 4,609,117 | A | 9/1986 | Pamment | |
| 4,630,332 | A | 12/1986 | Bisbing | |
| 4,664,347 | A | 5/1987 | Brown et al. | |
| 4,697,312 | A | 10/1987 | Freyer | |
| 4,711,161 | A | 12/1987 | Swin et al. | |
| 4,729,490 | A | 3/1988 | Ziegenbein | |
| 4,753,367 | A | 6/1988 | Miller et al. | |
| 4,763,808 | A | 8/1988 | Guhl et al. | |
| 4,765,548 | A | 8/1988 | Sing | |
| 4,765,579 | A | 8/1988 | Robbins et al. | |
| 4,792,039 | A | 12/1988 | Dayton | |
| 4,794,973 | A * | 1/1989 | Perisic | 160/291 |
| 4,834,260 | A | 5/1989 | Auten | |
| 4,867,339 | A | 9/1989 | Hahn | |
| 4,884,717 | A | 12/1989 | Bussard et al. | |
| 4,892,224 | A | 1/1990 | Graham | |
| 4,913,308 | A | 4/1990 | Culbertson | |
| 4,915,347 | A | 4/1990 | Iqbal et al. | |
| 4,918,568 | A | 4/1990 | Stone et al. | |
| 4,923,087 | A | 5/1990 | Burrows | |
| 4,948,004 | A | 8/1990 | Chich | |
| 4,964,523 | A | 10/1990 | Bieltvedt et al. | |
| 4,972,966 | A | 11/1990 | Craft, Jr. | |
| 4,996,467 | A | 2/1991 | Day | |
| 5,031,793 | A | 7/1991 | Chen et al. | |
| 5,054,724 | A | 10/1991 | Hutcheson | |
| 5,065,272 | A | 11/1991 | Owen et al. | |
| 5,065,891 | A | 11/1991 | Casey | |
| 5,090,785 | A | 2/1992 | Stamp | |
| 5,100,087 | A | 3/1992 | Ashby | |
| 5,111,958 | A | 5/1992 | Witthoeft | |
| D327,760 | S | 7/1992 | Donnelly | |
| D329,929 | S | 9/1992 | Knoedler et al. | |
| 5,147,055 | A | 9/1992 | Sampson et al. | |
| 5,156,290 | A | 10/1992 | Rodrigues | |
| 5,170,904 | A | 12/1992 | Neuhaus | |
| 5,174,462 | A | 12/1992 | Hames | |
| D335,562 | S | 5/1993 | Evans | |
| 5,213,272 | A | 5/1993 | Gallagher et al. | |
| 5,222,704 | A | 6/1993 | Light | |
| 5,226,558 | A | 7/1993 | Whitney et al. | |
| 5,230,525 | A | 7/1993 | Delmerico et al. | |
| 5,242,074 | A | 9/1993 | Conaway et al. | |
| D340,333 | S | 10/1993 | Duran et al. | |
| 5,249,693 | A | 10/1993 | Gillispie et al. | |
| 5,261,553 | A | 11/1993 | Mueller et al. | |
| 5,305,916 | A | 4/1994 | Suzuki et al. | |
| 5,314,151 | A | 5/1994 | Carter-Mann | |
| 5,322,179 | A | 6/1994 | Ting | |
| 5,348,222 | A | 9/1994 | Patey | |
| 5,381,588 | A | 1/1995 | Nelson | |
| 5,385,258 | A | 1/1995 | Sutherlin | |
| 5,390,818 | A | 2/1995 | LaBuda | |
| 5,404,621 | A | 4/1995 | Heinke | |
| 5,407,089 | A | 4/1995 | Bird et al. | |
| 5,419,452 | A | 5/1995 | Mueller et al. | |
| 5,471,708 | A | 12/1995 | Lynch | |
| 5,474,201 | A | 12/1995 | Liu | |
| 5,501,358 | A | 3/1996 | Hobday | |
| 5,520,067 | A | 5/1996 | Gabas | |
| 5,531,348 | A | 7/1996 | Baker et al. | |
| 5,535,913 | A | 7/1996 | Asbach et al. | |
| 5,558,254 | A | 9/1996 | Anderson et al. | |
| D377,554 | S | 1/1997 | Adriaansen | |
| 5,611,507 | A | 3/1997 | Smith | |
| 5,628,424 | A | 5/1997 | Gola | |
| 5,632,401 | A | 5/1997 | Hurd | |
| 5,636,416 | A | 6/1997 | Anderson | |
| 5,644,111 | A * | 7/1997 | Cerny et al. | 187/393 |
| 5,645,186 | A | 7/1997 | Powers et al. | |
| 5,650,680 | A | 7/1997 | Chula | |
| D383,277 | S | 9/1997 | Peters | |
| 5,662,235 | A | 9/1997 | Nieto | |
| 5,690,247 | A | 11/1997 | Boover | |
| 5,695,088 | A | 12/1997 | Kasbohm | |
| 5,699,929 | A | 12/1997 | Ouno | |
| D388,922 | S | 1/1998 | Peters | |
| D389,631 | S | 1/1998 | Peters | |
| 5,704,511 | A | 1/1998 | Kellams | |
| 5,724,837 | A * | 3/1998 | Shin | 68/196 |
| 5,730,312 | A | 3/1998 | Hung | |
| 5,732,845 | A | 3/1998 | Armaly, Jr. | |
| 5,735,495 | A | 4/1998 | Kubota | |
| 5,738,239 | A | 4/1998 | Triglia | |
| 5,799,909 | A | 9/1998 | Ziegler | |
| 5,816,431 | A | 10/1998 | Giannopoulos | |
| 5,816,640 | A | 10/1998 | Nishimura | |
| D401,719 | S | 11/1998 | Van Leeuwen et al. | |
| 5,873,643 | A | 2/1999 | Burgess, Jr. et al. | |
| 5,881,896 | A | 3/1999 | Presnell et al. | |
| 5,881,901 | A | 3/1999 | Hampton | |
| 5,884,237 | A * | 3/1999 | Kanki et al. | 702/113 |
| 5,887,748 | A | 3/1999 | Nguyen | |
| 5,967,392 | A | 10/1999 | Niemi et al. | |
| 5,987,708 | A | 11/1999 | Newton | |
| 6,000,569 | A | 12/1999 | Liu | |
| 6,010,024 | A | 1/2000 | Wang | |
| 6,024,238 | A | 2/2000 | Jaros | |
| 6,036,050 | A | 3/2000 | Ruane | |
| 6,102,239 | A | 8/2000 | Wien | |
| 6,123,215 | A | 9/2000 | Windle | |
| D431,700 | S | 10/2000 | Roudebush | |
| 6,126,031 | A | 10/2000 | Reason | |
| 6,129,233 | A | 10/2000 | Schiller | |
| D435,951 | S | 1/2001 | Yang et al. | |
| 6,209,744 | B1 | 4/2001 | Gill | |
| 6,211,637 | B1 | 4/2001 | Studer | |
| 6,234,339 | B1 | 5/2001 | Thomasd | |
| 6,250,492 | B1 | 6/2001 | Verbeek | |
| D445,980 | S | 7/2001 | Tjugum | |
| 6,286,706 | B1 | 9/2001 | Tucker | |
| 6,328,320 | B1 | 12/2001 | Walski et al. | |
| 6,345,725 | B1 | 2/2002 | Lin | |
| 6,364,147 | B1 | 4/2002 | Meinzinger et al. | |
| 6,386,386 | B1 | 5/2002 | George | |
| 6,390,321 | B1 | 5/2002 | Wang | |
| 6,401,958 | B1 | 6/2002 | Foss et al. | |
| 6,519,130 | B1 * | 2/2003 | Breslow | 361/170 |
| 6,557,716 | B1 | 5/2003 | Chan | |
| 6,596,983 | B2 * | 7/2003 | Brent | 250/221 |
| 6,626,316 | B2 | 9/2003 | Yang | |
| 6,626,317 | B2 | 9/2003 | Pfiefer et al. | |
| D482,169 | S | 11/2003 | Lin | |
| 6,659,407 | B2 | 12/2003 | Asaro | |
| 6,681,950 | B2 | 1/2004 | Miller, Jr. et al. | |
| D488,604 | S | 4/2004 | Yang et al. | |
| D488,903 | S | 4/2004 | Yang et al. | |
| D489,503 | S | 5/2004 | Lin | |
| D489,857 | S | 5/2004 | Yang et al. | |
| D490,583 | S | 5/2004 | Yang et al. | |
| D490,954 | S | 6/2004 | Brand | |
| D491,706 | S | 6/2004 | Yang et al. | |
| 6,758,366 | B2 | 7/2004 | Bourgund et al. | |
| D493,930 | S | 8/2004 | Wang | |
| D494,723 | S | 8/2004 | Lin | |
| 6,812,655 | B1 | 11/2004 | Wang et al. | |
| 6,814,249 | B2 | 11/2004 | Lin | |
| 6,837,393 | B1 | 1/2005 | Kuo | |
| 6,857,538 | B2 | 2/2005 | Lin | |
| 6,859,005 | B2 * | 2/2005 | Boliver | 318/480 |
| D503,021 | S | 3/2005 | Yang et al. | |
| 6,866,826 | B2 | 3/2005 | Moore et al. | |

(56) References Cited

U.S. PATENT DOCUMENTS 6,883,676 B2 4/2005 Lin
D507,090 S 7/2005 Yang et al.
6,920,994 B2 7/2005 Lin
D513,445 S 1/2006 Lin
6,981,606 B2 1/2006 Yang et al.
D517,764 S 3/2006 Wang
D517,767 S 3/2006 Yang et al.
D518,266 S 3/2006 Yang et al.
7,017,773 B2 3/2006 Gruber et al.
7,044,323 B2 5/2006 Yang
D525,756 S 7/2006 Yang et al.
7,077,283 B2 7/2006 Yang et al.
7,080,750 B2 7/2006 Wein et al.
7,086,550 B2 8/2006 Yang et al.
D528,726 S 9/2006 Lin
7,121,421 B2 10/2006 Yang et al.
D535,799 S 1/2007 Epps
D535,800 S 1/2007 Yang et al.
D537,223 S 2/2007 Lin
D537,599 S 2/2007 Lin
D537,601 S 2/2007 Lin
D537,999 S 3/2007 Lin
D538,995 S 3/2007 Lin
D539,498 S 3/2007 Yang et al.
D539,499 S 3/2007 Yang et al.
D540,001 S 4/2007 Zimmerman
D542,001 S 5/2007 Yang et al
D544,170 S 6/2007 Lin
D544,171 S 6/2007 Lin
D544,671 S 6/2007 Saunders et al.
D545,024 S 6/2007 Liao
7,225,943 B2 6/2007 Yang et al.
D547,020 S 7/2007 Chen
7,243,811 B1 7/2007 Ramsey
D550,918 S 9/2007 Wang et al.
D552,321 S 10/2007 Yang et al.
D552,823 S 10/2007 Yang et al.
D552,824 S 10/2007 Zimmerman
D552,825 S 10/2007 Yang et al.
D559,494 S 1/2008 Yang et al.
D559,495 S 1/2008 Yang et al.
D564,169 S 3/2008 Wang
D566,367 S 4/2008 Lin
D566,369 S 4/2008 Shek
D566,923 S 4/2008 Lin
7,374,060 B2 5/2008 Yang et al.
D571,520 S 6/2008 Lin
7,404,499 B1 7/2008 Ramsey
D576,371 S 9/2008 Zimmerman
D578,266 S 10/2008 Yang et al.
D578,722 S 10/2008 Yang et al.
7,438,199 B1 10/2008 Tidrick
D580,120 S 11/2008 Lin
D580,613 S 11/2008 Yang et al.
D580,615 S 11/2008 Yang et al.
D585,618 S 1/2009 Yang et al.
7,494,021 B2 2/2009 Yang et al.
7,540,396 B2 6/2009 Yang et al.
7,559,433 B2 7/2009 Yang et al.
D603,119 S 10/2009 Yang et al.
7,656,109 B2 2/2010 Yang et al.
D611,216 S 3/2010 Yang et al.
D611,671 S 3/2010 Yang et al.
7,694,838 B2 4/2010 Yang et al.
7,703,622 B1 4/2010 Bynoe
D615,722 S 5/2010 Yang et al.
7,712,285 B2 5/2010 Stravitz et al.
7,741,801 B2 6/2010 Fukuizumi
7,748,556 B2 7/2010 Yang et al.
7,781,995 B2 * 8/2010 Yang et al. .................... 318/266
D631,221 S 1/2011 Yang et al.
D632,864 S 2/2011 Yang et al.
D634,911 S 3/2011 Yang et al.
7,896,187 B2 3/2011 Haibel
7,922,024 B2 4/2011 Yang et al.
7,950,543 B2 5/2011 Yang et al.
D644,390 S 8/2011 Smeets et al.
8,074,833 B2 12/2011 Yang et al.
8,096,445 B2 1/2012 Yang et al.
8,136,688 B2 3/2012 Lee et al.
D657,108 S 4/2012 Yang et al.
D657,109 S 4/2012 Liao
2001/0002690 A1 6/2001 Rosky
2001/0020619 A1 9/2001 Pfeifer et al.
2002/0079315 A1 6/2002 Yang
2002/0092853 A1* 7/2002 Wang ........................... 220/263
2002/0096524 A1 7/2002 Hardesty
2002/0104266 A1* 8/2002 Ranaudo ......................... 49/334
2003/0089719 A1 5/2003 Berger
2003/0201267 A1 10/2003 Yang et al.
2003/0230576 A1 12/2003 Lin
2004/0004080 A1 1/2004 Yang et al.
2004/0016756 A1 1/2004 Lin
2004/0020927 A1 2/2004 Yang et al.
2004/0134924 A1 7/2004 Hansen et al.
2004/0140782 A1* 7/2004 Okabe et al. .................. 318/445
2004/0164077 A1 8/2004 Kuo
2004/0174268 A1* 9/2004 Scott et al. ................. 340/686.6
2004/0175303 A1 9/2004 Lin
2004/0200938 A1 10/2004 Forlivio
2004/0206758 A1 10/2004 Lin
2004/0206760 A1 10/2004 Gagnebin
2004/0251746 A1* 12/2004 Ichimaru et al. .............. 307/116
2005/0017006 A1 1/2005 Kuo
2005/0017010 A1 1/2005 Siegel et al.
2005/0103788 A1 5/2005 Yang et al.
2005/0133506 A1 6/2005 Yang et al.
2005/0230396 A1 10/2005 Yang et al.
2005/0230397 A1 10/2005 Yang et al.
2005/0258794 A1* 11/2005 Fukuizumi .................... 318/480
2005/0284870 A1 12/2005 Yang et al.
2006/0027579 A1 2/2006 Yang et al.
2006/0056741 A1 3/2006 Yang et al.
2006/0103086 A1 5/2006 Niemeyer et al.
2006/0175336 A1 8/2006 Wang
2006/0186121 A1 8/2006 Yang et al.
2006/0196874 A1 9/2006 Yang
2006/0213910 A1 9/2006 Yang et al.
2006/0226149 A1 10/2006 Yang et al.
2006/0249510 A1 11/2006 Lin
2006/0255033 A1* 11/2006 Yang et al. .................... 220/211
2006/0261071 A1 11/2006 Yang et al.
2007/0012699 A1 1/2007 Yang
2007/0034334 A1 2/2007 Ramsey et al.
2007/0090112 A1 4/2007 Kalman et al.
2007/0112699 A1 5/2007 Zhao et al.
2007/0114847 A1* 5/2007 Ichimaru et al. ............. 307/10.1
2007/0181579 A1 8/2007 Kuo et al.
2007/0182551 A1 8/2007 Yang et al.
2007/0205195 A1 9/2007 Yang et al.
2007/0241109 A1 10/2007 Lin
2007/0266637 A1* 11/2007 McGowan ...................... 49/349
2007/0272691 A1* 11/2007 Wang et al. ................... 220/211
2007/0289972 A1 12/2007 Wynn et al.
2008/0011754 A1 1/2008 Ramsey
2008/0011910 A1 1/2008 Ramsey
2008/0083756 A1 4/2008 Daniels
2008/0164257 A1* 7/2008 Boll et al. ..................... 220/264
2008/0236275 A1* 10/2008 Breed et al. ................. 73/290 V
2008/0237234 A1 10/2008 Yang et al.
2008/0257889 A1 10/2008 Kovacevich et al.
2008/0257890 A1 10/2008 Kovacevich et al.
2008/0257891 A1 10/2008 Kovacevich et al.
2008/0264948 A1 10/2008 Kovacevich et al.
2008/0264950 A1 10/2008 Kovacevich et al.
2008/0272127 A1 11/2008 Kovacevich et al.
2009/0084788 A1 4/2009 Yang et al.
2009/0230131 A1 9/2009 McDuffie et al.
2010/0170904 A1 7/2010 Kalman et al.
2010/0224627 A1 9/2010 Yang et al.
2010/0237074 A1 9/2010 Yang et al.
2011/0220646 A1 9/2011 Yang et al.

(56) References Cited

U.S. PATENT DOCUMENTS

| | | | |
|---|---|---|---|
| 2011/0220647 A1 | 9/2011 | Yang et al. |
| 2011/0220648 A1 | 9/2011 | Yang et al. |
| 2011/0220655 A1 | 9/2011 | Yang et al. |

FOREIGN PATENT DOCUMENTS

| | | | | |
|---|---|---|---|---|
| DE | 1610087 | | | 6/1950 |
| DE | 1283741 | | | 7/1966 |
| DE | 8436939 | | | 3/1985 |
| DE | 4225936 | A1 | | 2/1994 |
| DE | 19525885 | | | 3/1997 |
| DE | 19809331 | | | 5/1999 |
| DE | 19933180 | | | 1/2001 |
| DE | 10148997 | | | 4/2003 |
| DE | 20217561 | | | 3/2004 |
| EP | 0582240 | | | 7/1993 |
| EP | 0903305 | A1 | | 3/1999 |
| EP | 0906876 | | | 4/1999 |
| EP | 1094017 | | | 4/2001 |
| EP | 1361176 | | | 11/2003 |
| EP | 1136393 | | | 4/2004 |
| EP | 1647503 | A1 | | 4/2006 |
| EP | 1686073 | | | 8/2006 |
| FR | 2887152 | | | 12/2006 |
| GB | 2384418 | | | 7/2003 |
| JP | 02 152670 | | | 6/1990 |
| JP | 02-152670 | | | 6/1990 |
| JP | 06-272888 | | | 9/1994 |
| JP | D1300450 | | | 5/2007 |
| JP | D1300451 | | | 5/2007 |
| KR | 3003841370000 | | | 6/2005 |
| KR | 3004095430000 | | | 3/2006 |
| KR | 3004095430001 | | | 7/2006 |
| TW | D112733 | | | 9/2006 |
| TW | D129485 | | | 7/2009 |
| TW | D133382 | | | 2/2010 |
| TW | D133678 | | | 3/2010 |
| TW | D147147 | | | 5/2012 |
| WO | WO 92/02430 | | | 2/1992 |
| WO | WO 2006079263 | A1 | * | 8/2006 |
| WO | WO 2009/114495 | | | 9/2009 |

OTHER PUBLICATIONS

U.S. Appl. No. 29/386,880, filed Mar. 4, 2011, Yang et al.
European Search Report for Application No. EP 10002273, dated Jan. 4, 2011, in 9 pages.
European Search Report for European Application No. EP 06010394, dated Aug. 24, 2006, in 1 page.
Partial European Search Report for Application No. EP 10002273, dated Jul. 2, 2010, in 4 pages.
Search Report for Taiwan Design Patent Application No. 099304439, dated Jul. 1, 2011, in 1 page.
U.S. Appl. No. 13/417,084, filed Mar. 9, 2012.
U.S. Appl. No. 29/411,482, filed Jan. 20, 2012.
U.S. Appl. No. 29/411,490, filed Jan. 20, 2012.
U.S. Appl. No. 29/411,491, filed Jan. 20, 2012.

* cited by examiner

TRASH CAN WITH POWER OPERATED LID

BACKGROUND OF THE INVENTION

1. Field of the Invention

The present inventions relate to power operated devices, such as power operated lids or doors for receptacles.

2. Description of the Related Art

Receptacles and other devices having a lid or a door are used in a variety of different settings. For example, in both residential and commercial settings, trash cans and other devices often have lids for protecting or preventing the escape of the contents of the receptacle. In the context of trash cans, some trash cans include lids or doors to prevent odors from escaping and to hide the trash within the receptacle from view. Additionally, the lid of a trash can helps prevent contamination from escaping from the receptacle.

Recently, trash cans with power operated lids have become commercially available. Such trash cans can include a sensor positioned on or near the lid. Such a sensor can be configured to detect movement, such as a user's hand being waived near the sensor, as a signal for opening the lid. When such a sensor is activated, a motor within the trash receptacle opens the lid or door and thus allows a user to place items into the receptacle. Afterwards, the lid can be automatically closed.

However, such motion sensors present some difficulties. For example, users of current trash cans with power operated lids can experience problems if the trash within the receptacle or can is piled higher than the level of the lid itself. If the trash or other material within the can is higher than the level of the lid itself, the lid will be unable to completely close. This can cause the motor or batteries to wear down, continue running, and/or ultimately fail. It can also force the user to reset the controller, remove trash, or manually compress the trash until the lid can be closed.

Additionally, typical motion sensors are configured to detect changes in reflected light. Thus, a user's clothing and skin color can cause the device to operate differently. More particularly, such sensors are better able to detect movement of a user's hand having one clothing and skin color combination, but less sensitive to the movement of another user's hand having a different clothing and/or skin color combination. Additionally, sensors can be sensitive to lights being turned on and off in a room, or moved across or in front of the trash can.

If such a sensor is calibrated to detect the movement of any user's hand or body part within, for example, twelve inches of the sensor, the sensor may also be triggered accidentally. If the sensor is triggered accidentally too often, the batteries powering such a device can be worn out too quickly, energy can be wasted, and/or the motor can be over used. However, if the sensors are calibrated to be less sensitive, it can be difficult for some users, depending on their clothing and/or skin color combination, to activate the sensor conveniently.

Problems also exist if the battery or other power source accumulates a charge or charges on its ends. These charges may give a false indication of the actual voltage differential across the battery, and can cause the motor and/or lid to move or act differently or run at different speeds during different uses.

Additionally, problems exist if users wish to empty multiple sets or handfuls of trash. Once the sensor has been activated, the lid can rise to an open position, and then can automatically close. However, once the lid begins to close, the user is forced to wait until the lid has reached a fully closed position before it can be opened again. If the user suddenly wants to open the lid again, or has another collection of trash to throw away while the lid is closing, he or she must wait until the lid has returned to its fully closed position before activating the sensor again.

SUMMARY OF THE INVENTION

An aspect of at least one of the inventions disclosed herein includes the realization that occasionally, a user of a trash can having a power operated lid may desire to place or pile enough trash or material in the can such that the pile of trash sits higher than the level of the lid or door. In use, this can prevent the lid or door from fully closing. To address this problem, an enclosed receptacle can be provided with a power operated lid or door with a drive mechanism or motor and gear assembly which is, at least in part, releasably coupled to the door to allow the drive mechanism to continue operating regardless of whether the door can fully close.

Thus, in accordance with at least one embodiment, an enclosed receptacle can comprise a receptacle portion defining a reservoir, a door mounted relative to the receptacle and configured to move between opened and closed positions, a power supply, and a motor and gear assembly configured to move the door between the opened and closed positions, at least a portion of the motor and gear assembly configured to be releasably coupled to the door.

Another aspect of at least one of the embodiments disclosed herein includes the realization that the problems associated with motion sensors mounted on a trash receptacle to detect movement of a user's hand or foot can be avoided by incorporating a light read module configured to read and store values corresponding to ambient light. For example, but without limitation, the sensor can be of the type that emits a predetermined frequency of infrared light within its immediate surroundings. When a user's hand or foot (or other object) moves in front of the sensor, and reflects back the infrared light at the same frequency it was being emitted, for a predetermined period of time, a light read module within the trash can's controller can be activated. When the light read module is activated, it can read ambient light values and store their calibrated values. These stored values can be used to compare with other light reflections later on. Thus, the sensor is less susceptible to false detections caused by other light reflecting sources in the room, including but not limited to lamps and interior lighting.

Thus, in accordance with at least one embodiment disclosed herein, an enclosed receptacle can comprise a receptacle portion defining a reservoir, a door mounted relative to the receptacle and configured to move between opened and closed positions, a power supply, a motor and gear assembly configured to move the door between the opened and closed positions, and a controller configured to control operation of the door, the controller comprising a light read module configured to read and store calibrated values corresponding to ambient light.

Yet another aspect of at least one of the inventions disclosed herein includes the realization that the voltage difference across a battery or other power source may change over time due to accumulation of charge at one or both ends. In order to accommodate for this change, and ensure motor speeds and lid movements which are substantially similar each time the device is used, an enclosed receptacle can include a module which senses the battery and creates a scaled motor drive value prior to each use. In at least one embodiment, the module can first place a load on the battery or power source, and then sense the voltage across the battery prior to creating the scaled motor drive value.

Thus, in accordance with at least one embodiment disclosed herein, an enclosed receptacle can comprise a receptacle portion defining a reservoir, a door mounted relative to the receptacle and configured to move between opened and closed positions, a power supply, a motor and gear assembly configured to move the door between the opened and closed positions, and a controller configured to control operation of the door, the controller comprising a power supply sense module configured to sense a power supply voltage and create a scaled motor drive value.

Yet another aspect of at least one of the inventions disclosed herein includes the realization that users can often place items on top of trash can doors, or there can be obstructions in the pathway of an opening door. Additionally, the door, motor, or power source may malfunction or be too weak to open the door. In order to prevent a motor or power source from burning out, an enclosed receptacle can include a pre-sensor. The pre-sensor can monitor whether a portion of the motor and gear assembly or door has reached a predetermined location within a predetermined time period. If the sensor is not actuated, or does not detect the presence of the motor and gear assembly or door within the predetermined time period, a fault detection module can cause the motor to stop running. If the pre-sensor has been reached, then the door can slow down on its way to a fully open position.

Thus, in accordance with at least one embodiment disclosed herein, an enclosed receptacle can comprise a receptacle portion defining a reservoir, a door mounted relative to the receptacle and configured to move between opened and closed positions, a power supply, a motor and gear assembly configured to move the door between the opened and closed positions, and a controller configured to control operation of the door. The controller can comprise a door position monitor having a pre-sensor configured to detect when at least a portion of the motor and gear assembly has reached a predetermined position prior to a fully opened position, a braking module configured to slow the movement of the door after the door has reached the pre-sensor, and a fault detection module configured to stop operation of the motor and to provide an indication of a fault if the motor has been operating for more than a predetermined time period.

Yet another aspect of at least one of the inventions disclosed herein includes the realization that once a door on an enclosed receptacle is fully open, the user can want some amount of time to elapse before the door starts closing again. This time period allows the user to place additional bags, trash, or items in the receptacle.

Thus, in accordance with at least one embodiment disclosed herein, an enclosed receptacle can comprise a receptacle portion defining a reservoir, a door mounted relative to the receptacle and configured to move between opened and closed positions, a power supply, a motor and gear assembly configured to move the door between the opened and closed positions, and a controller configured to control operation of the door. The controller can comprise a door position monitor having a top sensor configured to detect the position of the door when the door reaches a fully opened position, a fault detection module configured to stop operation of the motor and to provide an indication of a fault if the motor has been operating for more than a predetermined time period, and wherein the controller is further configured to stop the motor for a predetermined period of time when the door is at its fully open position.

Yet another aspect of at least one of the inventions disclosed herein includes the realization that users can often have multiple sets or handfuls of trash to place in an enclosed receptacle. However, once the door begins to close towards a home position, the user might have to wait until it has reached its home or fully closed position before it can be opened again. If the user suddenly wants to open the door again, or has another collection of trash to throw away while the door is closing, he or she must wait until the door has returned to its fully closed position before activating it again. In order to address this problem, an enclosed receptacle can include at least one sensor and a controller with a module. The user can activate the sensor, and the module will stop the lid from closing, reverse the direction of the motor and door, and slow the motor down such that the door will slowly begin to open again.

Thus, in accordance with at least one embodiment disclosed herein, an enclosed receptacle can comprise a receptacle portion defining a reservoir, a door mounted relative to the receptacle and configured to move between opened and closed positions, a power supply, a motor and gear assembly configured to move the door between the opened and closed positions, and a controller configured to control operation of the door. The controller can comprise at least one door movement trigger module configured to allow a user to issue a command to the controller to open the door, a door position monitor having a home sensor configured to detect when at least a portion of the motor and gear assembly reaches a fully closed position, and a fault detection module configured to stop operation of the motor and to provide an indication of a fault if the motor has been operating for more than a predetermined time period, and wherein the door movement trigger module is configured to activate a reduced motor speed and cause the door to move toward a fully open position.

BRIEF DESCRIPTION OF THE DRAWINGS

The above-mentioned and other features of the inventions disclosed herein are described below with reference to the drawings of preferred embodiments. The illustrated embodiments are intended to illustrate, but not to limit the inventions. The drawings contain the following Figures.

DETAILED DESCRIPTION OF THE PREFERRED EMBODIMENT

The embodiments of a powered system for opening and closing a lid or door of a receptacle or other device is disclosed in the context of a trash can. The inventions disclosed herein are described in the context of a trash can because they have particular utility in this context. However, the inventions disclosed herein can be used in other contexts as well, including, for example, but without limitation, large commercial trash cans, doors, windows, security gates, and other larger doors or lids, as well as doors or lids for smaller devices such as high precision scales, computer drives, etc.

Figure 1:
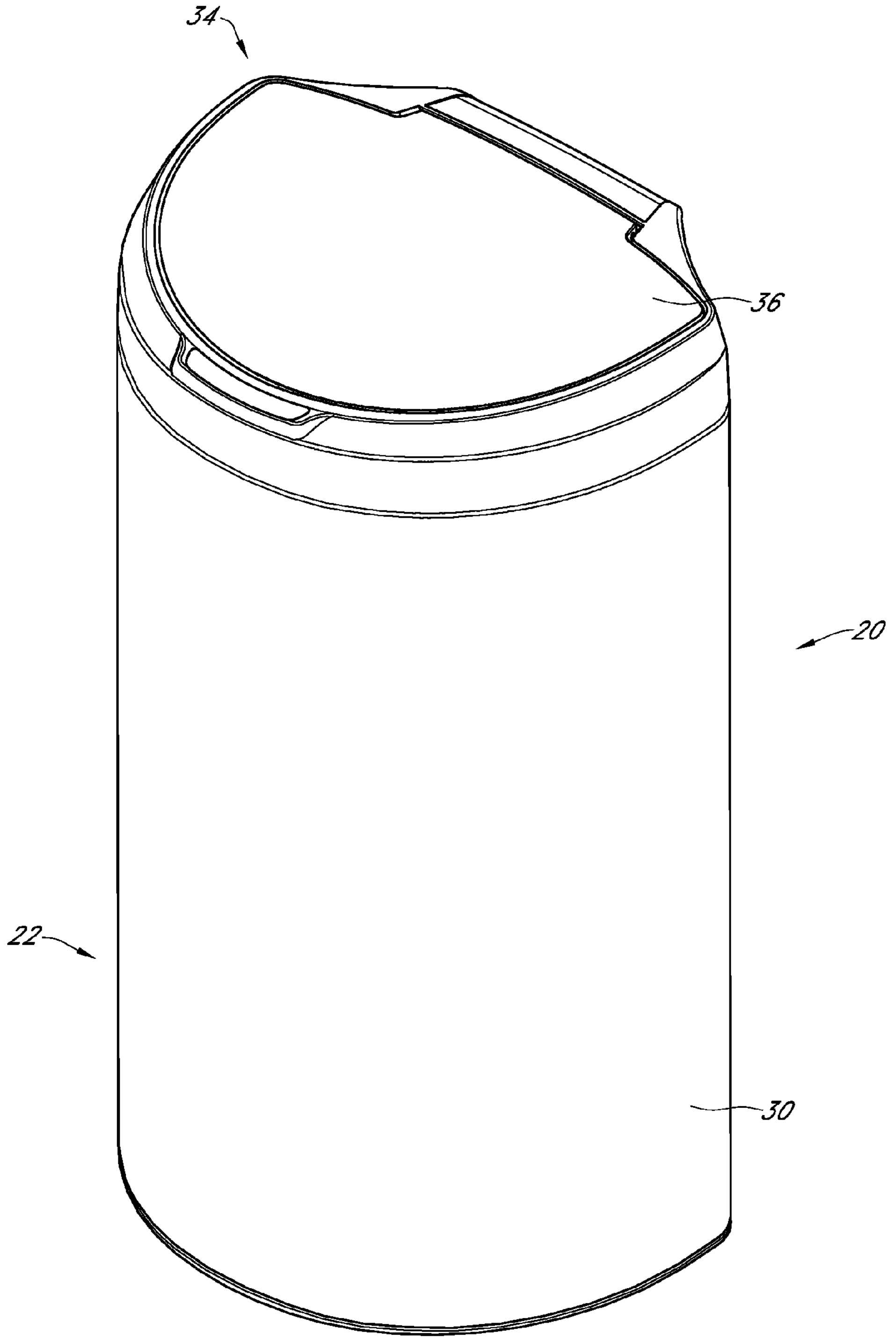
FIG. 1 is a top, front, and left side perspective view of an embodiment of an enclosed receptacle, with its door closed.
Figure 2:
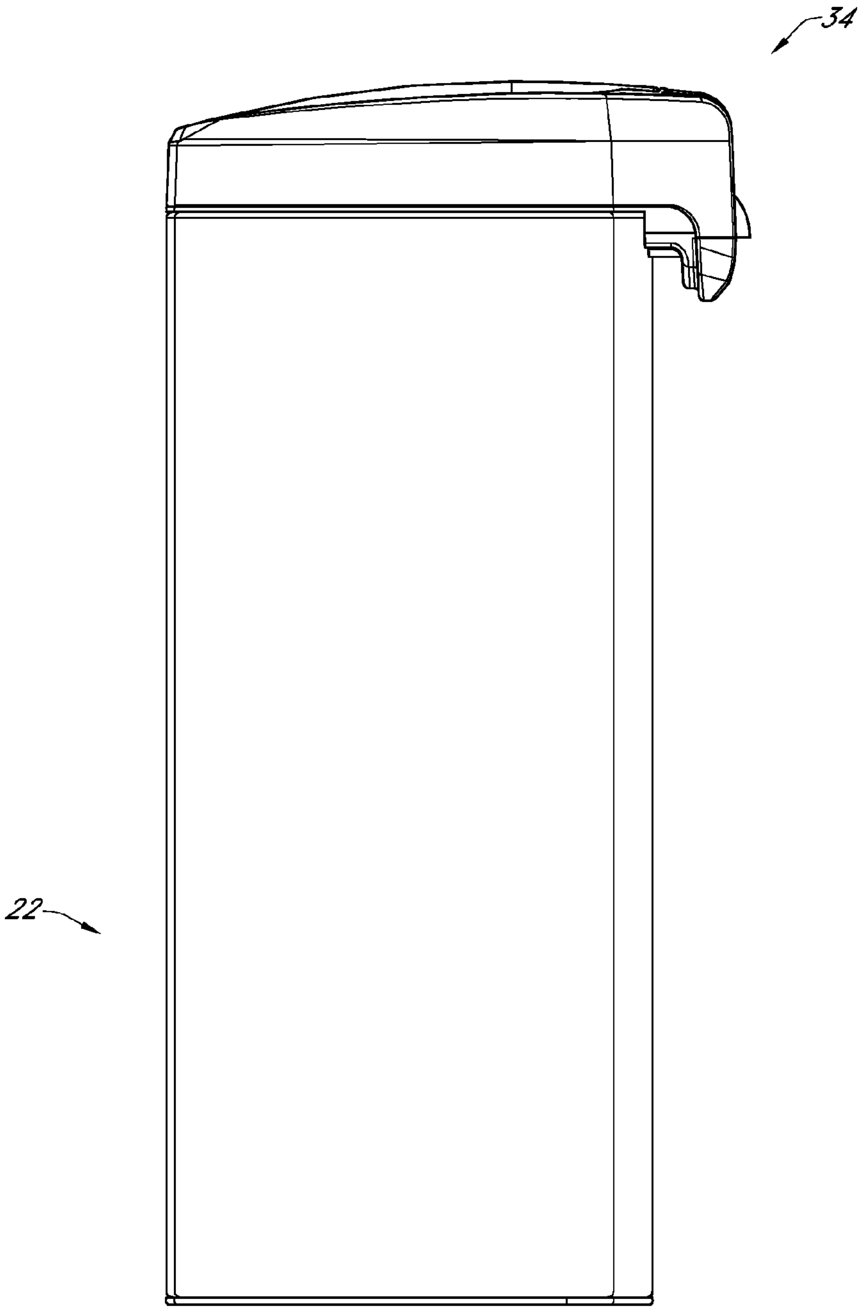
FIG. 2 is a left side elevational view of an embodiment of an enclosed receptacle.

With reference to FIGS. 1 and 2, a trash can assembly 20 can include an outer shell component 22 and door 34. Door 34 can include door components, including but not limited to door component 36. The trash can assembly 20 can sit substantially flush with a floor, and can be of varying heights and widths depending on, among other things, consumer need, cost, and ease of manufacture.

Figure 3:
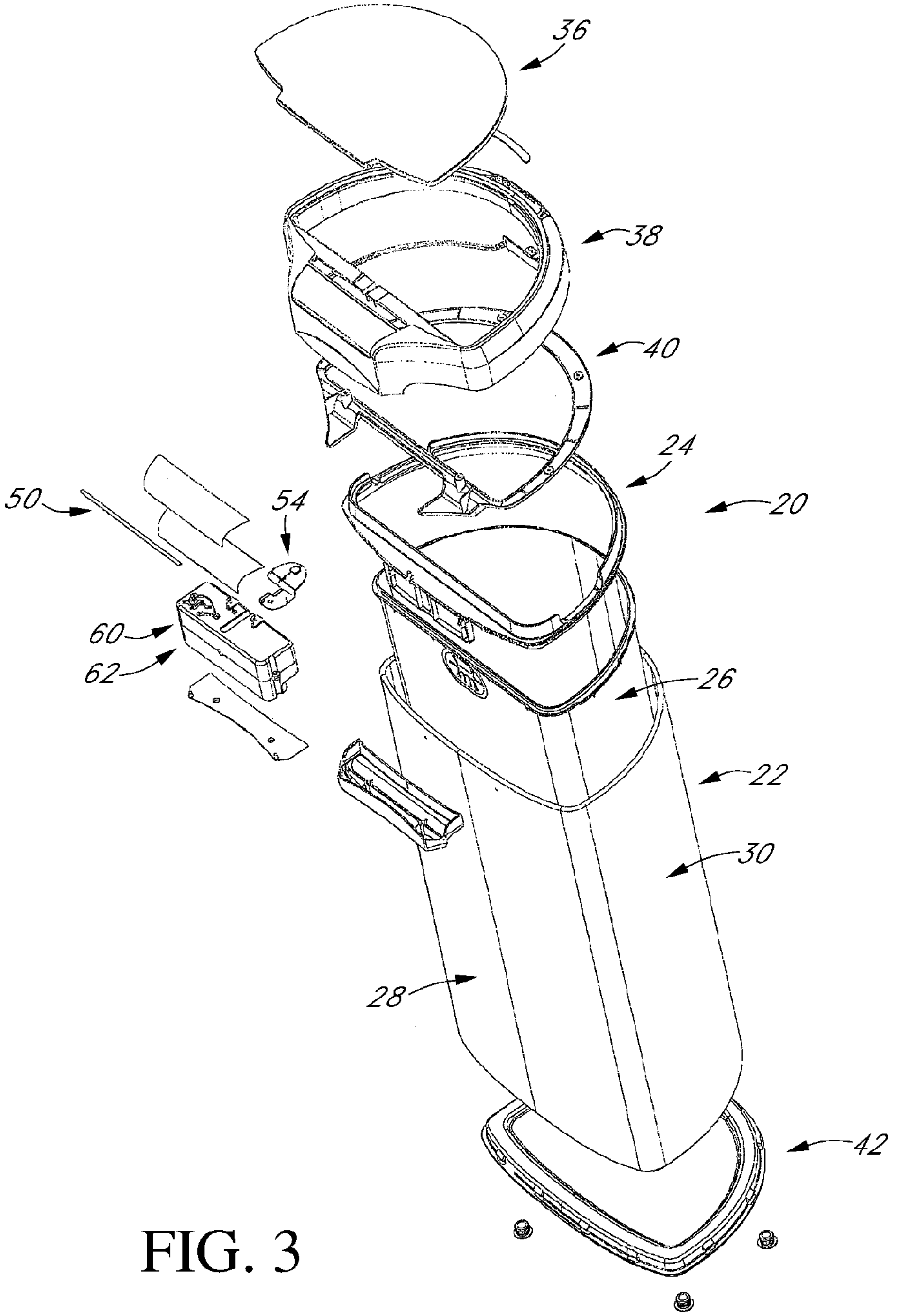
FIG. 3 is an exploded top, back, and right side perspective view of an embodiment of an enclosed receptacle.

With reference to FIG. 3, a trash can assembly 20 can include outer shell components 22 and 24, and an inner liner 26 configured to be retained within the outer shell components. For example, an upper peripheral edge of the outer shell component 24 can be configured to support an upper peripheral edge of inner liner 26, such that the inner liner is suspended by its upper peripheral edge within the outer shell components 22 and 24. Other designs can also be used.

The outer shell component 22 can assume any configuration. The non-limiting embodiment of FIG. 3 illustrates an outer shell component 22 having a generally semi-circular configuration with a rear wall 28 and a curved, front wall 30. The inner liner can have the same general configuration, or a different configuration from the outer shell component 22. The outer shell components 22 and 24 can be made from plastic, steel, stainless steel, aluminum or any other material.

Figure 5:
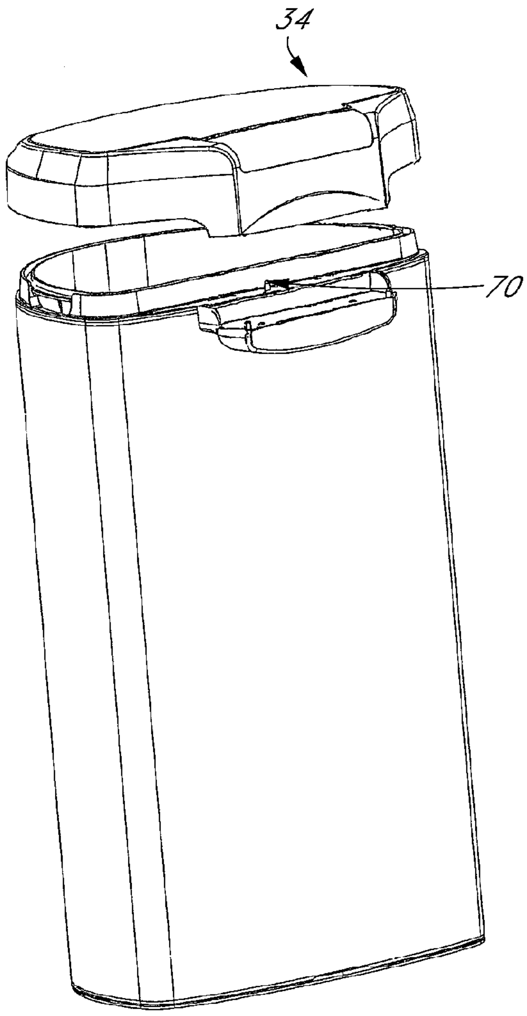
FIG. 5 is a top, back, and left side perspective view of an embodiment of an enclosed receptacle with the door components removed.

Door components 36, 38, and 40 are connected to form a door 34 as shown in FIG. 1 and FIG. 5. Door 34 has a door component 36, which is pivotally attached to door component 38. The pivotal connection can be defined by any type of connection allowing for pivotal movement, such as, for example, but without limitation, a hinge 50 as shown in FIG. 3.

The trash can assembly 20 can also include a base 42. The base 42 can include screws or other components for attachment to the outer shell component 22, and can have a flat lower portion for resting on a surface, such as a kitchen floor. The base 42 of the trash can assembly 20 can be made integrally, monolithically, or separate from the outer shell component 22. Thus, the base 42 can be made from any material including plastic, steel, stainless steel, aluminum or any other material. Additionally, in some embodiments, such as those in which the outer shell component 22 is stainless steel, the base 32 can be a plastic material.

The sensor (not shown) can be any type of sensor. For example, in some embodiments, the sensor is configured to detect the presence of reflecting infrared light. In such embodiments, the sensor emits infrared light at a predetermined frequency. When a user's hand or foot (or other object) moves in front of the sensor, the infrared light is reflected back. When the sensor detects reflection of the infrared light at a predetermined frequency, such as for example 2-6 Hz, for a predetermined amount of time, at which point the sensor becomes activated, and the motor begins to move the lid or door to an open position. Other frequencies can also be used, as can other types of light. Thus, the sensor can be considered a "user input device" because a user can use the sensor to issue a command to the trash can 20.

The sensor can be coupled to a lid control system configured to control the opening and closing of the door component 36. In one embodiment, the lid control system can include wiring provided inside the trash can connecting the sensor to a circuit board 58. The circuit board 58, in turn, can be coupled via wiring to a motor gear 56 that drives a rotary lifting gear 54.

Figure 4:
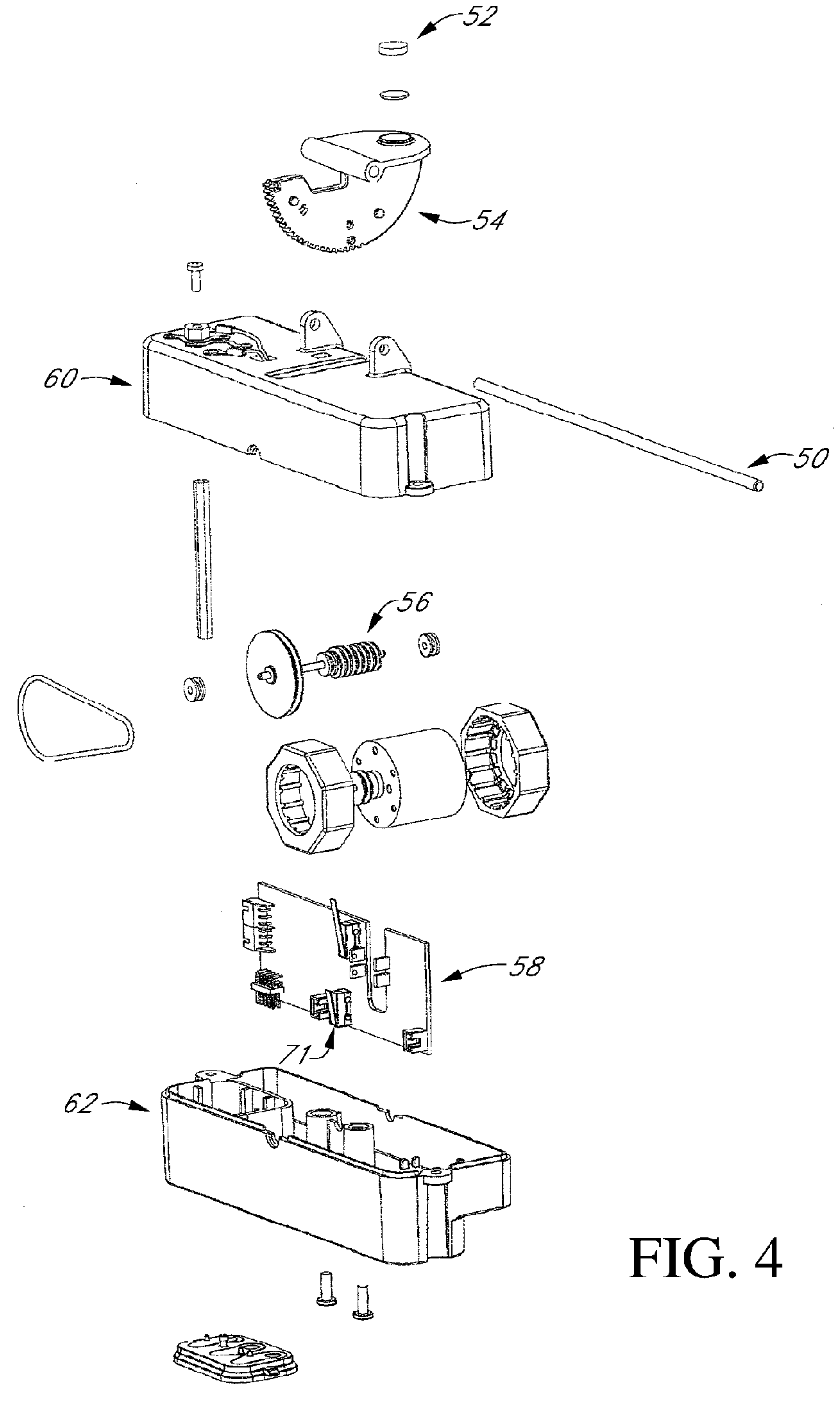
FIG. 4 is an exploded top, back, and right side perspective view of the controller and motor and gear assembly as shown in FIG. 3.

As illustrated in FIG. 4, a motor gear assembly can include the motor gear 56 and rotary lifting gear 54. The motor, when activated, turns the motor gear 56, which in turn turns or rotates the rotary lifting gear 54. The rotary lifting gear 54 can include a magnet 52 or some other releasably connecting device, along its top surface. The magnet 52 acts to releasably connect with another magnet located on the underside of door component 36. The rotary lifting gear 54 is coupled to a hinge 50 through an elongated opening or aperture in the rotary lifting gear. The hinge 50 is also coupled to an outer housing component 60 through two openings in flanges along the upper portion of the housing component 60, and is additionally independently coupled to the door component 36. Thus, the rotary lifting gear 54 and door component 36 can rotate independently from one another about the hinge 50.

In some embodiments, the motor gear 56 can be driven in two directions so that the motor gear 56 can lift or pull the door component 36 both up and down. For example, when the motor gear 56 rotates in a first direction, the rotary lift gear 54 is pushed in a generally upwards direction to push the door component 36 towards a fully open position. When the motor gear 56 rotates in an opposite second direction, the rotary lift gear 54 will move in a generally downwards direction to pull the door component 36 towards a fully closed position.

In use, the user can activate the sensor within the trash can by moving his or her hand (or other object) in front of the sensor for a predetermined period of time. Once the sensor has become activated, the motor gear 56 turns the rotary lifting gear 54. The rotary lifting gear 56, which is attached via its magnet to the magnet on the underside of door component 36, pushes the door component 36 towards an open position. When the lid returns towards its closed position, the rotary lifting gear pulls down on the door component 36. If the garbage level is too high, and the door component 36 cannot return to its normally closed position, the magnets holding the rotary lifting gear 56 and the door component 36 will separate, allowing the motor and gear assembly to continue operating.

The controller, or circuit board 58, is illustrated in FIG. 4 and can include a control circuit that is configured to control the operation of the motor gear 56 and the opening and closing motions of the door component 36. The control circuit can be housed in housing components 60 and 62, and implemented using circuit designs that are well known to those skilled in the art. For example, although indicated as a "circuit," the control circuit can comprise a processor and memory storing a control program. As such, the control program can be written to cause the processor to perform various functions for controlling the motor gear 56 in accordance with input from a sensor or sensors.

In some embodiments, a plurality of sensors can be provided in spaced-apart manner. In other words, any number (e.g., one or more) of sensors can be provided, depending on the desired use. Providing a greater number of sensors can allow the user to actuate one of the sensors more easily because the user only needs to place a hand or foot (or other object) in the direct path of any of the sensors, while providing a single sensor requires that the user place the hand or foot (or other object) in the direct path of a single sensor. The plurality of sensors can be coupled via wiring to a circuit board.

The power supply for the trash can device can comprise a battery pack, an alternating current (AC) power supply, a direct current (DC) power supply, or any combination of these or other power supplies. The power supply can be coupled both to the circuit board 58 and the motor gear 56.

With continued reference to FIG. 5, in some embodiments, the trash can assembly 20 can include a power switch. The power switch can comprise a physical switch, solid state switch, or any other kind of switch. In some configurations, the power switch can comprise a stationary plunger 70 mounted to the upper peripheral edge of the outer shell component 24. As such, the switch can also include a physical electrical switch 71 (FIG. 4) biased toward an open circuit position and connected in series with the power supply. The physical switch 71 can be arranged such that the plunger 70 contacts the physical switch 71 and closes the associated power circuit when the door 34 is placed upon the upper peripheral edge of the outer shell component 24. As such, then the door 34 is removed from the upper peripheral edge of the outer shell component 24, the power circuit of the trash can 20 is opened, thereby cutting power. When the door 34 is replaced, power is restored. As such, when a user removes the door 34 from the upper peripheral edge of the outer shell component 24, the controller will not cause the lid 36 to open. Additionally, if the door 34 was removed to replace batteries, the door will lid will similarly not be opened as the new batteries are inserted. This is ensures, in some embodiments, because the physical switch 71 is disposed within the door assembly 34 and thus will not be moved into the closed position unless a small thin object is inserted into a hole (not shown) aligned with the physical switch 71.

The modules described below with reference to FIGS. 6-11 are described in the format of flow charts representing control routines that can be executed by an ECU. However, these control routines can also be incorporated into hard-wired modules or a hybrid module including some hard-wired components and some functions performed by a microprocessor.

Figure 6:
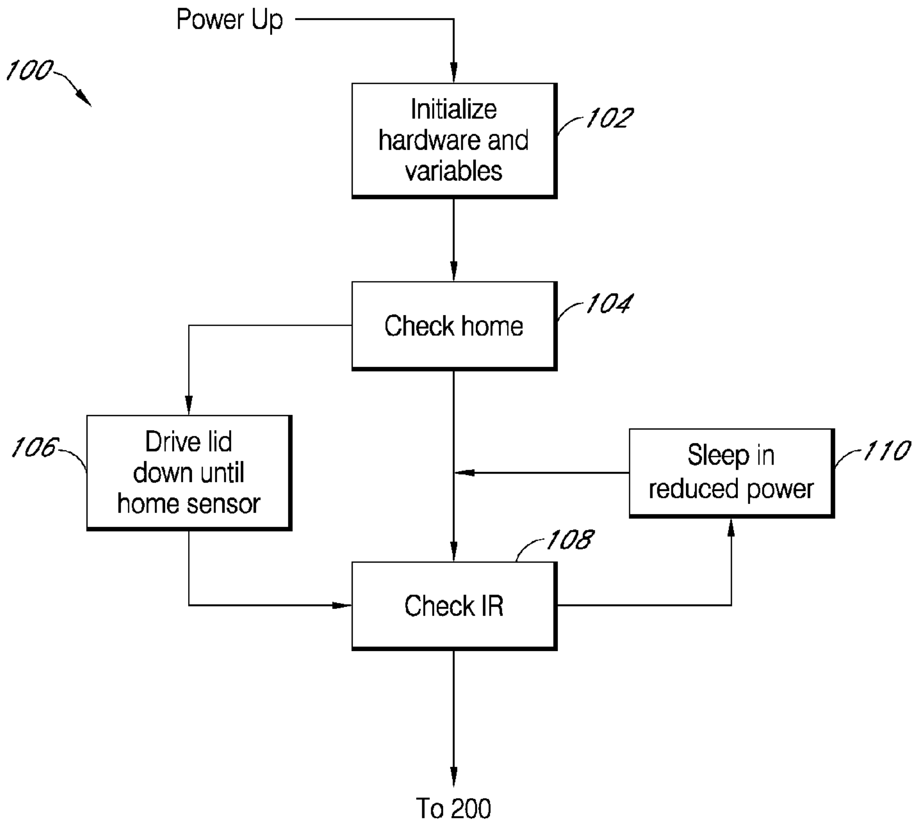
FIG. 6 is a flow chart illustrating a control routine for controlling the actuation of sensors.

With reference to FIG. 6, the control routine 100 can be used to control the actuation of the sensor. The control routine 100 is configured to periodically activate the sensor so as to reduce power consumption. In a preferred embodiment, the sensor sends out an infrared light pulse once every 0.25 seconds. Although only one sensor is referenced below, it is to be understood that any sensor or combination of sensors can be controlled to reduce power consumption.

The control routine 100 can begin operation at an operation block 102. In the operation block 102, the control routine 100 can be started when batteries are inserted into a battery compartment, when the power switch 71 (FIG. 4) is moved to an "on" position, or at any other time. During the operation block 102, the control routine initializes the hardware and variables in the controller. After the operation block 102, the control routine 100 moves on to a decision block 104.

In decision block 104, the controller determines whether the door component 36 is in a home position. If the door component 36 is not in a home position, the motor gear assembly, including motor gear 56 and rotary lifting gear 54, are activated by operation block 106 to drive the door component 36 down until it has reached a home position. The home position is determined by activation of a home sensor or sensors.

Once the door component 36 has reached a home position, the decision block 108 determines if there is any infrared reflection. A sensor, which is activated in operation block 102, emits the infrared light in pulses. The sensor additionally monitors for reflection of the infrared light. If the infrared light is reflected back to the sensor at the same frequency with which it is being emitted (e.g. 4 Hz), for a predetermined period of time (e.g. 2 seconds), then control routine 200 is activated. If, however, there is no indication of reflected infrared light at the same frequency and for a predetermined period of time, then operation block 108 and decision block 110 continue to cycle. Operation block 110 places the controller in a sleep mode, with reduced power. During this mode, the sensor continues to emit infrared light at the predetermined frequency. The cycle of operation block 108 and decision block 110 therefore consists of emitting infrared light at a predetermined frequency while continuously checking for infrared reflection.

Figure 7:
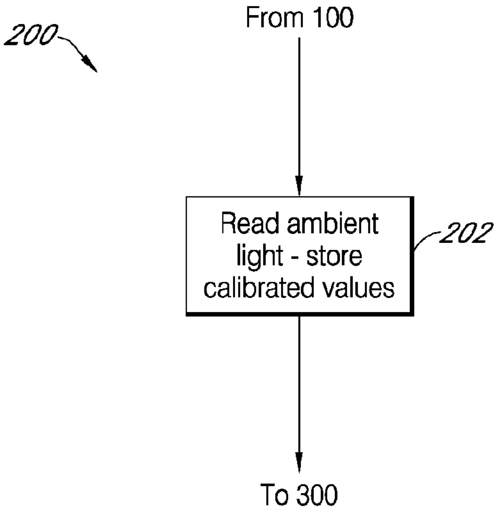
FIG. 7 is a flow chart illustrating a control routine for controlling the detection and storage of calibrated ambient light values.

With reference to FIG. 7, the control routine 200 can be used to control the detection and storage of calibrated ambient light values. Control routine 200 can begin at any time. For example, the control routine 200 can begin after the operation block 108 (FIG. 6) or at any other time. In some embodiments, the control routine 200 can be performed whenever the power supply is activated. For example, the control routine can be performed when the physical switch 71 is closed. In some embodiments, the control routine 200 can be performed after a predetermined delay after the switch 71 has been closed.

Operation block 202 comprises a light reading step in which ambient light and/or reflections are detected and stored as calibrated values corresponding to the ambient light. These ambient light values are used by the controller to make the controller less susceptible to false detections caused by other light reflecting sources in the room, including but not limited to lamps and interior lighting. The calibrated values are thus used to help determine when a user is actually intending to actuate or operate the device, as opposed to circumstances in which a sensor in the trash can is detecting reflection of infrared or other light that is not intended to actuate the device.

Thus, in processes described below, the controller (such as the ECU 80 in FIG. 12, described below) can compare the intensity of the ambient light and/or reflections stored in operation block 202 with light detected by the sensor 90 at any time after operation block 202. If the intensity of the detected light is less than or equal to the intensity of the stored calibration values, then the controller can ignore the detection and leave the lid 36 closed. On the other hand, the controller can be configured to drive the motor 70 to open the lid 36 only if the detected light has a greater intensity than that of the stored calibration values. However, other techniques can also be used.

Figure 8:
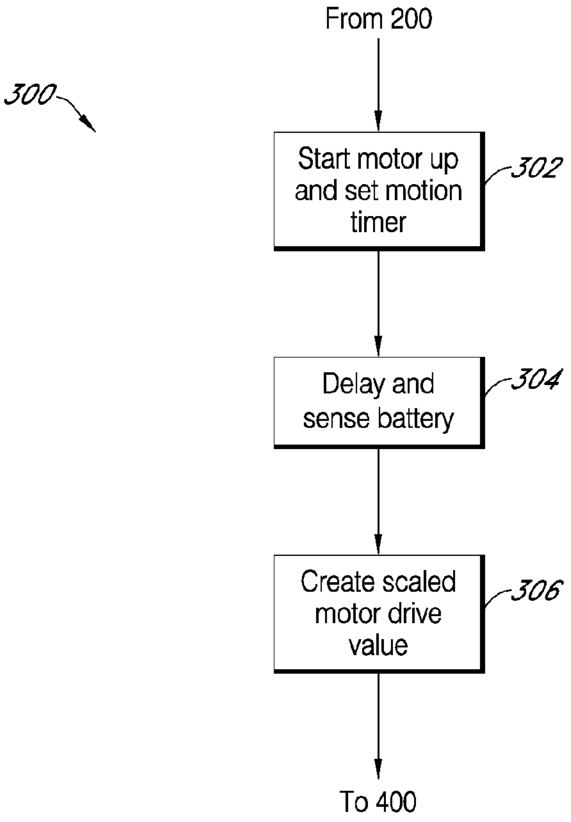
FIG. 8 is a flow chart illustrating a control routine for controlling the detection of battery voltages and creating scaled motor drive values.

With reference to FIG. 8, the control routine 300 can be used to control the detection of battery voltages and create scaled motor drive values. The control routine 300 begins once the control routine 200 has finished calibrating the ambient light values. In the operation block 302, the controller starts the motor and begins a motion timer. This timer may initially be set to zero and allowed to run forwards towards a time limit, or set to a predetermined time and allowed to run backwards towards a time limit.

Once the motor has begun and the motion timer has been initiated, the operation block 304 delays the motor and senses the battery voltage. Often times, charge may build up on the ends of a battery through material build-up, static, etc., distorting what the actual voltage is across the terminals of the battery. As opposed to reading the voltage prior to any use of the motor, operation block 304 senses the actual voltage once the motor has begun running. This helps the controller obtain a more accurate reading of the voltage across the battery. In operation block 306, the controller creates a scaled motor drive value based on the sensed voltage in operation block 304. It is this scaled motor drive value which is used throughout the rest of control routines 400, 500, and 600.

Figure 9:
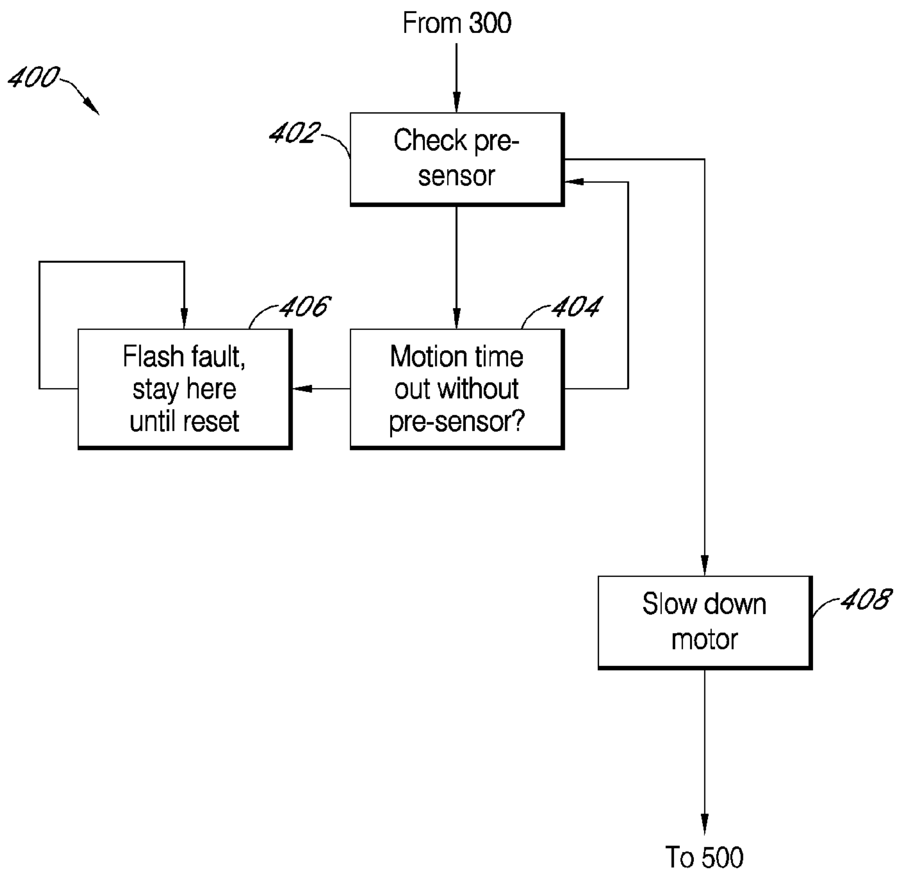
FIG. 9 is a flow chart illustrating a control routine for controlling the actuation of an electronic motor and gear assembly prior to reaching a pre-sensor.

With reference to FIG. 9, the control routine 400 can be used to control the actuation of an electronic motor and gear assembly prior to reaching a pre-sensor. The control routine 400 begins once control routine 300 has created a scaled motor drive value and begun to drive the motor and gear assembly. Decision block 402 determines if a pre-sensor has been reached. The pre-sensor may be any type of sensor. The pre-sensor determines or checks to see if the rotary lifting gear 54 and/or the door component 36 have reached a predetermined position on their way up towards a fully opened position. If decision block 402 indicates that the pre-sensor has not been reached or activated, or that the pre-sensor has not detected the rotary lifting gear 54 and/or door component 36, another decision block 404 is reached. Decision block 404 checks to see if the motion timer of control routine 300 has reached a predetermined time limit.

If the motion timer has reached its predetermined time limit, operation block 406 is activated, which causes a flash fault. A flash fault detection module then stops the operation of the motor and provides an indication of fault, such as for example a flashing light somewhere on the trash can, to indicate that the controller needs to be reset or turned off prior to continued use.

If the motion timer has not reached its predetermined time limit in decision block 404, the controller continues to loop back to decision block 402 and check for activation of the pre-sensor. Once the pre-sensor is activated, operation block 408 slows down the speed of the motor. This prevents the door from reaching its fully opened position at too rapid a speed, and prevents the motor from having to make a sudden stop.

Figure 10:
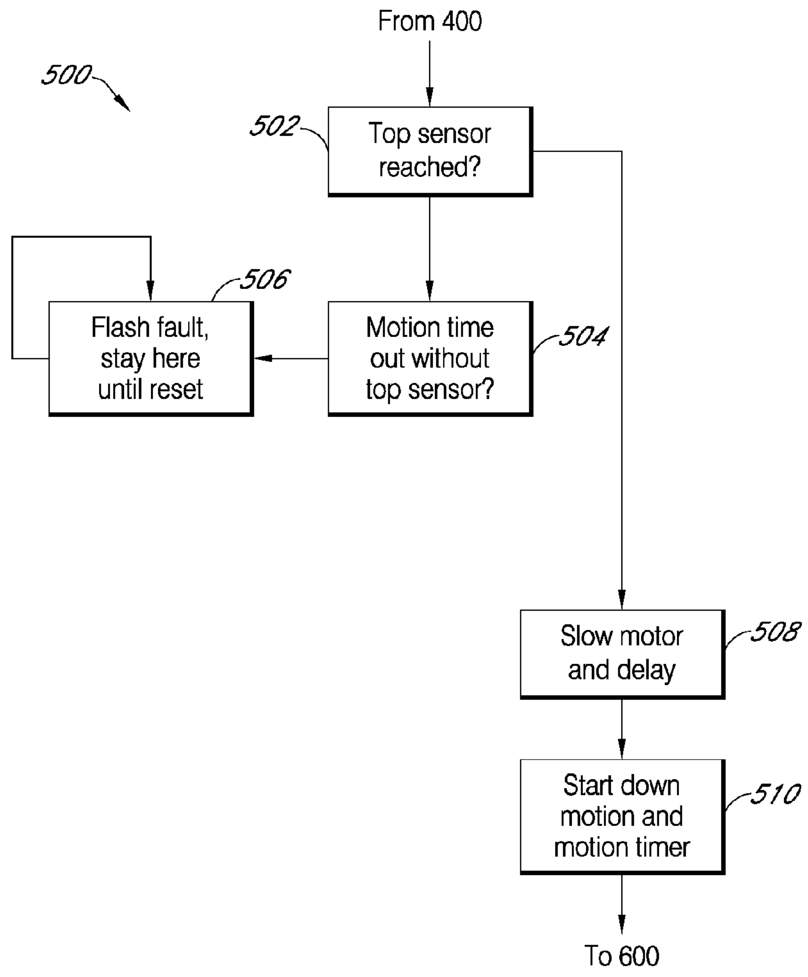
FIG. 10 is a flow chart illustrating a control routine for controlling the actuation of an electronic motor and gear assembly after reaching a pre-sensor and prior to reaching a top sensor.

With reference to FIG. 10, the control routine 500 can be used to control the actuation of an electronic motor and gear assembly after reaching a pre-sensor and prior to reaching a top sensor. The control routine 500 begins once operation block 408 begins to slow down the motor. Decision block 502 determines if a top sensor has been reached. The top sensor may be any type of sensor. The top sensor determines or checks to see if the rotary lifting gear 54 and/or the door component 36 have reached a predetermined, fully open position. If the top sensor is not activated, or has not sensed that the rotary lifting gear 54 and/or door component 36 have reached their top position, a decision block 504 checks to see if a motion timer has reached a predetermined time limit. This motion timer may be the same motion timer as that of control routine 300, or it may be a different motion timer.

If the motion timer has not reached its predetermined time limit, the control routine loops back to decision block 502, again checking to see if the top sensor has been activated, or reached. If, however, the motion timer has reached its predetermined time limit, operation block 506 is activated, which causes a flash fault. Just as in control routine 400, a flash fault detection module then stops the operation of the motor and provides an indication of fault, such as for example a flashing light somewhere on the trash can, to indicate that the controller needs to be reset or turned off prior to continued use.

Once decision block 502 determines that the top sensor has been activated, operation block 508 stops and delays operation of the motor for a predetermined period of time. In one embodiment, this period of time can be four seconds. Other periods of time, or delay periods, are also possible. The delay period aids the user by giving him or her extra time to place more garbage in the trash can, or to look into the trash can and observe its contents prior to the door closing.

Once the motor has been delayed for the predetermined period of time, operation block 510 starts the motor in the reverse direction, causing the rotary lifting gear 54 and/or door component 36 to move towards a fully closed position. Operation block 510 additionally begins a motion timer. The motion timer may be the same as that of control routine 300, or it may be an entirely separate motion timer within the controller.

Figure 11:
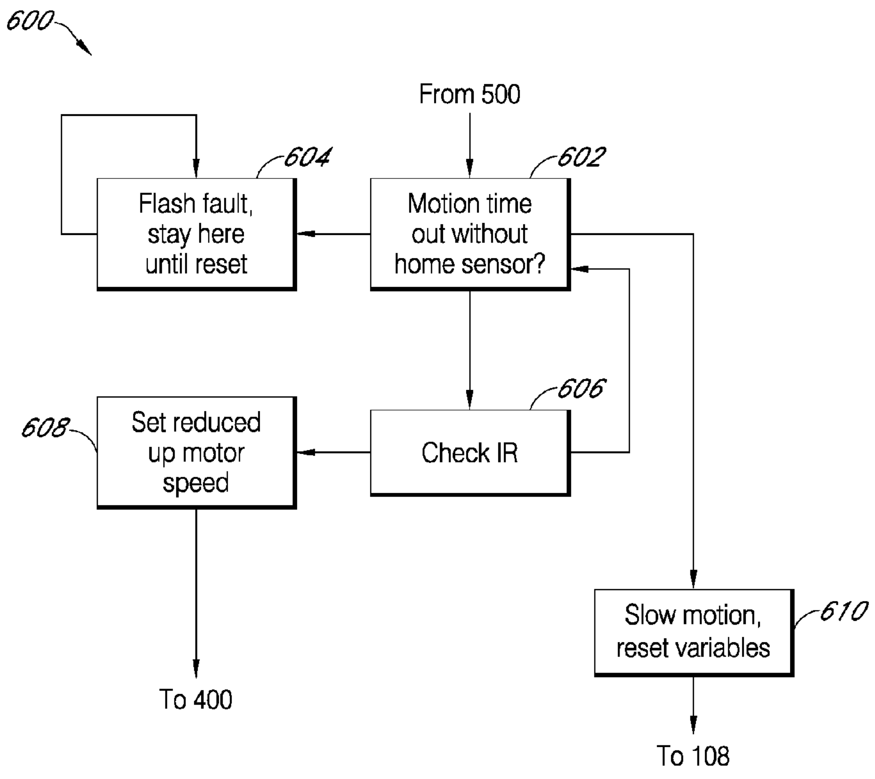
FIG. 11 is a flow chart illustrating a control routine for controlling the actuation of an electronic motor and gear assembly after reaching a top sensor.

With reference to FIG. 11, the control routine 600 can be used to control the actuation of an electronic motor and gear assembly after reaching a top sensor. The control routine 600 begins after operation block 508 has started the motor and motion timer. Once the rotary lifting gear 54 and/or door component 36 are moving towards a fully closed position, a decision block 602 checks to see if a home sensor has been activated, or has detected that the rotary gear 54 and/or door component 36 has reached a fully closed position. The decision block 602 also checks to see if the motion timer of control routine 500 has reached a predetermined time limit. In those uses or instances where the level of garbage is higher than the fully closed position of the door component 36, the door component 36 may separate from the rotary lifting gear 54 while both are being lowered by the motor. This separation will prevent the door component 36 from further moving towards a fully closed position, but will still allow the rotary lifting gear 54 to continue on its path towards a fully closed position. Thus, the home sensor is still able to detect when the rotary lifting gear 54 has reached its home, or fully closed, position.

If the home sensor has not been activated, and the motion timer has reached its predetermined time limit, the operation block 604 is activated, which causes a flash fault. Just as in control routines 400 and 500, a flash fault detection module then stops the operation of the motor and provides an indication of fault, such as for example a flashing light somewhere on the trash can, to indicate that the controller needs to be reset or turned off prior to continued use.

If the home sensor has not been activated, and the motion timer has not reached its predetermined time limit, decision block 606 begins to check for reflection of infrared light through a sensor. This sensor can be the same sensor as that of control routine 100, or it can be an entirely different sensor. The sensor of control routine 600, just as that of control routine 100, emits pulses of infrared light in a predetermined frequency. If a user's hand or foot (or other object) moves in front of the sensor and reflects back the infrared light at the same frequency for a predetermined period of time (e.g. 2 seconds), operation block 608 causes the motor to reverse direction and slow down to a reduced speed. This causes the rotary lifting gear 54 and/or door component 36 to move back towards a fully open position. Often times a user can have large amounts of trash or garbage to throw away, or can become distracted while using a trash can. If the user sees that the door component 36 is closing and wants it to open again without having to wait for the door component 36 to completely close, the controller, and specifically decision block 606 and operation block 608, allow the use to slowly reopen the door component 36. Once operation block 608 causes the motor to reverse direction and slow down to a reduced speed, the controller reverts back to the beginning of control routine 400.

If the decision block 606 determines that there is no reflection of infrared light at a predetermined frequency for a predetermined period of time, control routine 600 loops back to decision block 602.

If decision block 602 determines that a home sensor has been reached and the motion timer has not reached its predetermined time limit, operation block 610 stops the motor and resets the variables in the controller. This operation block causes control routine 600 to loop back to decision block 108 in control routine 100.

Figure 12:
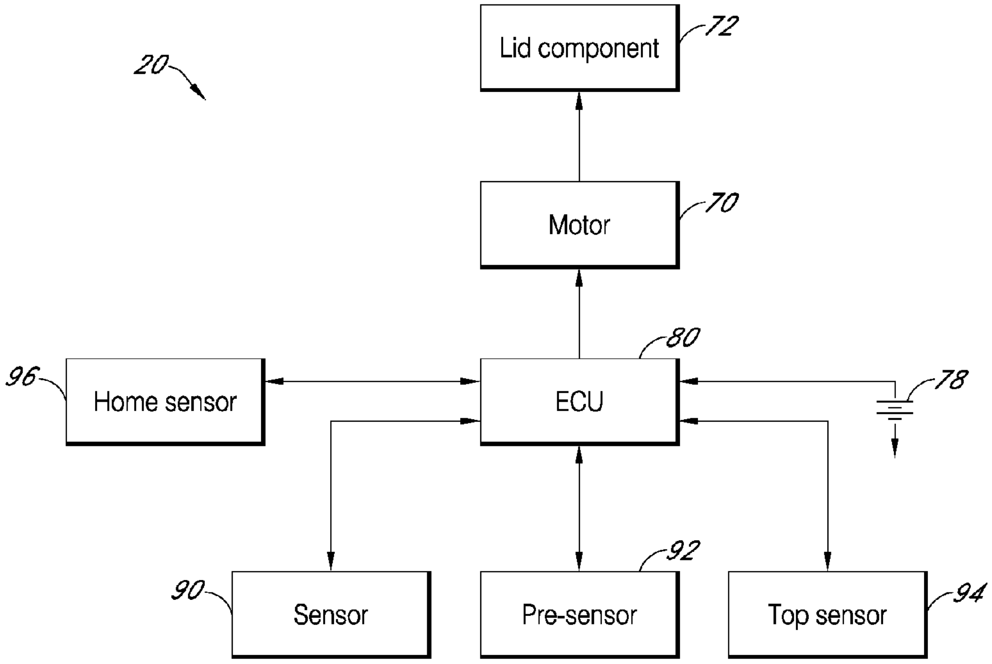
FIG. 12 is a schematic diagram illustrating a control system for a trash can in accordance with an embodiment.

FIG. 12 schematically illustrates an embodiment of a trash can receptacle 20 that can include various features and embodiments of the inventions disclosed herein.

With continued reference to FIG. 12, an ECU 80 can include one or a plurality of circuit boards providing a hard wired feedback control circuits, a processor and memory devices for storing and performing control routines, or any other type of controller. In an exemplary but non-limiting embodiment, the ECU 80 can include an H-bridge transistor/MOSFET hardware configuration which allows for bidirectional drive of an electric motor, and a microcontroller such as Model No. PIC16F685 commercially available from Microchip Technologies, Inc., and/or other devices.

In some embodiments, the ECU 80 can be configured to determine when a lid component reaches its maximum open position based on the signal from a top sensor 94. For example, but without limitation, the ECU 80 can be configured to count the number of pulses it receives from the sensor 94, each pulse representing one tooth of an encoder wheel passing the sensor 94, to determine the number of rotations of a motor shaft or motor gear from the beginning of the actuation of the electric motor 70. The number of pulses generated by the movement of the lid component from the closed position to the open position can be determined and stored within the ECU 80 as a reference value. Thus, the ECU 80 can count the pulses from the beginning of the actuation of the motor and then stop the motor when the ECU 80 receives the stored number of pulses from the top sensor 94.

The ECU can similarly be configured to determine when the lid component has reached a pre-sensor 92, the pre-sensor 92 being at an intermediate position between a fully closed position and a fully opened position.

The ECU 80 can be configured to perform in a number of different ways. For example, the ECU 80 can be configured to open and close the lid component in accordance with the description set forth above. However, the ECU 80 can be programmed to open the lid component 72 in other manners.

When closing the lid component 72, the ECU 80 can also rely on the output of the home sensor 96 to determine when the rotary gear 86 and/or lid component 72 has reached its closed position. However, the ECU 80 can optionally be configured to detect an output from the home sensor 96 for determining when the rotary gear and/or lid component 72 is closed. Thus, for example, when the ECU 200 drives the motor gear 70 to close the rotary gear and/or lid component 72, the ECU 200 can continue to provide power to the motor until a detection signal is received from the home sensor 96. At that time, the ECU 80 can stop directing power to the motor because the signal from the home sensor 96 indicates the rotary gear and/or lid component 72 is closed.

This provides a further recalibration of the ECU 80 each time the lid rotary gear and/or lid component 72 is closed. For example, because the ECU 80 is not relying solely on the output of the home sensor 96 and the proper rotation of the encoder wheel, errors associated with the encoder wheel can be avoided.

The ECU can further be configured to read ambient light values and store the calibrated values. These stored values can be used by the ECU to prevent false triggering of the sensor 90. For example, in some embodiments the ECU can detect whether the light being received by sensor 90 is the same infrared light that was emitted by sensor 90, as opposed to merely ambient light from the surrounding environment.

The trash can receptacle can include an actuator or motor 70. The actuator can be any type of actuator. For example, but without limitation, the actuator can be an AC or DC electric motor, stepper motor, server motor, solenoid, stepper solenoid, or any other type of actuator. Optionally, the actuator can be connected to the lid component 72 through a motor gear, rotary gear, and magnet. The magnet can be releasably coupled to the lid component 72. The motor gear can be, for example, a worm gear.

In some embodiments, a sensor device 90 can include an infrared type sensor. For example, as illustrated in FIG. 12, the sensor 90 can include a light emitting portion and a light receiving portion. The light emitting and light receiving portions can be separate, or in some embodiments they can be part of the same device. Thus, in use, a beam of infrared light can be emitted from the light emitting portion and reflected back and received by the light receiving portion. This reflection occurs as a result of the user placing his or her hand or some object in front of the infrared sensor and reflecting back the emitted infrared light for a predetermined period of time at a predetermined frequency.

The sensor 90 can be configured to emit a trigger signal when the infrared light beam is reflected back to the light receiving portion. For example, if the sensor 90 is activated and the light receiving portion receives the reflected infrared light emitted from the light emitting portion, then the sensor 90 can emit a trigger signal. This trigger signal can be used for controlling operation of the motor or actuator 70.

The sensor 90 can be operated in a pulsating mode. For example, the light emitting portion can be powered on and off in a cycle such as, for example, but without limitation, for short bursts lasting for any desired period of time (e.g., 0.01 second, 0.1 second, 1 second) at any desired frequency (e.g., once per half second, once per second, once per ten seconds). These different time characteristics can be referred to as an activation period or frequency, which corresponds to the periodic activation of the sensor 90. Thus, an activation frequency of four times per second would be equivalent to an activation period of once per quarter second.

The sensor 90 can be connected to a circuit board, an integrated circuit, or other device for triggering the actuator. In the illustrated embodiment of FIG. 13, the sensor 90 is connected to the ECU 80. However, other arrangements can also be used.

The trash can receptacle 20 can also include a power supply 78. The power supply 78 can be a battery or can include electronics for accepting AC or DC power.

In operation, the ECU 80 can activate the sensor 90, continuously or periodically, to detect the presence of an object in front of sensor 90. When an object blocks the infrared light beam and reflects the infrared light back, the ECU 80 determines that a lid opening cycle should begin. The ECU 80 can then actuate the actuator to drive the rotary gear and/or lid component 72 towards a fully opened position.

The trash can receptacle 20 can also include a pre-sensor 92, top sensor 94, and home sensor 96 as described above. The ECU 80 can communicate with the pre-sensor, top sensor, and home sensor to determine the position of the rotary gear and/or lid component 72.

Although these inventions have been disclosed in the context of certain preferred embodiments and examples, it will be understood by those skilled in the art that the present inventions extend beyond the specifically disclosed embodiments to other alternative embodiments and/or uses of the inventions and obvious modifications and equivalents thereof. In addition, while several variations of the inventions have been shown and described in detail, other modifications, which are within the scope of these inventions, will be readily apparent to those of skill in the art based upon this disclosure. It is also contemplated that various combinations or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

What is claimed is:

1. An enclosed receptacle comprising:

a receptacle portion defining a reservoir;

a door mounted relative to the receptacle and configured to move between opened and closed positions;

a power supply;

a drive mechanism or motor and gear assembly configured to move the door between the opened and closed positions; and a controller configured to control operation of the door, the controller comprising:

a door position monitor having a pre-sensor configured to detect when the door has reached a predetermined position prior to the opened position, a top sensor configured to detect when the door has reached the opened position, and a home sensor configured to detect when the door has reached the closed position; and a braking module configured to slow an upward movement of the door after the door has reached the pre-sensor, the drive mechanism or motor and gear assembly configured to create a transitional movement of the door from a first speed between the home sensor and pre-sensor to a second, slower speed between the pre-sensor and the top sensor during the upward movement of the door, wherein a first magnet is located on the door and a second magnet is located on a portion of the drive mechanism or motor and gear assembly, the magnets configured to releasably hold the door to at least a portion of the drive mechanism or motor and gear assembly.

2. The receptacle according to claim 1, wherein at least a portion of the drive mechanism or motor and gear assembly is configured to be releasably coupled to the door.

3. The receptacle according to claim 1, wherein the drive mechanism or motor and gear assembly is separately hinged from the door.

4. The receptacle according to claim 1, wherein the magnets are configured to release from one another if the door is restrained from moving toward the closed position.

5. The receptacle according to claim 1 wherein the controller comprises at least one door movement trigger module configured to allow a user to issue a command to the controller to open the door, the at least one door movement trigger module comprising a light emitter device and a light receiver device, the door movement trigger module being triggered when the light receiver device detects a given frequency of reflected light for a specified period of time.

6. The receptacle according to claim 5, wherein the light emitted is infrared light.

7. The receptacle according to claim 1, wherein the controller comprises a light read module configured to read and store calibrated values corresponding to ambient light.

8. The receptacle according to claim 7, wherein the light read module calibrates and stores ambient light values prior to a power supply sense module sensing a power supply voltage.

9. The receptacle according to claim 1, wherein the controller comprises a power supply sense module configured to sense a power supply voltage and create a scaled motor drive value.

10. The receptacle according to claim 9, wherein the controller is further configured to start the motor and set a motion timer.

11. The receptacle according to claim 9, wherein the power supply module is configured first to place a load on the power supply, and then to sense a power supply voltage.

12. The receptacle according to claim 1, wherein the controller comprises:

a fault detection module configured to stop operation of the motor and to provide an indication of a fault if the motor has been operating for more than a predetermined time period while the door is moving between the home sensor and pre-sensor or between the pre-sensor and top sensor.

13. The receptacle of claim 12, wherein the controller further comprises a motion timer, the motion timer configured to detect the predetermined time period.

14. The receptacle of claim 1 wherein the controller is configured to stop the motor for a predetermined period of time when the door is at the opened position; and wherein the controller is configured to begin downward movement of the door.

15. The receptacle of claim 1, wherein the controller comprises at least one door movement trigger module configured to allow a user to issue a command to the controller to open the door when the door is moving towards the closed position.

16. The receptacle of claim 15, wherein the controller is configured to stop the motor and reset when the home sensor is activated.

* * * * *